United States Patent Office 3,758,415
Patented Sept. 11, 1973

3,758,415
METHOD FOR THE EXPANSION OF VERMICULITE
Takeo Wada, Osaka, Japan, assignor to Takeda Chemical Industries, Ltd., Osaka, Japan
No Drawing. Filed July 13, 1971, Ser. No. 162,256
Claims priority, application Japan, July 14, 1970, 45/61,560
Int. Cl. B01j 1/10; C04b 31/26
U.S. Cl. 252—378 R        18 Claims

ABSTRACT OF THE DISCLOSURE

Method of expanding vermiculite by irradiating it with microwaves.

---

This invention relates to a method for expanding vermiculite. More particularly, the invention relates to a method of expanding vermiculite characterized in that vermiculite is irradiated with electromagnetic wave.

"Vermiculite" is a generic designation signifying minerals with water of crystallization which belong to the mica group. Those minerals have the property to expand when rapidly heated to a temperature beyond a certain critical level.

The expanded vermiculite which has been obtained by rapid heating of vermiculite ore at a temperature of not lower than 800° C. has recently been used in widely varied industrial applications, such as architectural materials, heat insulators, packing materials, etc. by virtue of its light weight and heat-insulating and acoustic properties. It has also been known that vermiculite can be expanded by the treatment with hydrogen peroxide on a laboratory scale.

The present inventor has now unexpectedly found that vermiculite is easily allowed to expand by the irradiation of electromagnetic wave of a specific range of frequencies, also that the electromagnetic wave-expanded vermiculite possesses some additional desirable qualities which are not found in the vermiculite expanded by rapid heating, namely, ion exchangeability, humidity control property, high water holding capacity and the property to eliminate ammoniacal odors, besides its light weight, sound absorption and heat insulation properties and attractive appearance which are also observed in the vermiculite expanded by rapid heating.

The present inventor has further found that in accordance with the present invention much less energy is required for a certain expansion per unit volume of vermiculite as compared with the hitherto known methods. That is to say, in the method of the present invention, the required energy per unit weight is usually only about $\frac{1}{100}$ as compared with the rapid heating method and about $\frac{1}{10}$ as compared with the known method involving the use of hydrogen peroxide.

Furthermore, the present inventor has unexpectedly found that the expansion of vermiculite by the irradiation of electromagnetic wave is performed more effectively in the presence of polor molecules or cations, the molecules or cations having lower molecular weight not more than 5000.

It is the main object of the present invention to provide an industrially advantageous method for the production of the expanded vermiculite having the desirable properties.

Said object is realized by irradiating vermiculite with an electromagnetic wave.

The electromagnetic wave to be employed according to this invention is usually a microwave or far infrared radiation and the frequency range that is useful is generally about 1 megacycle per second to about 10,000 kilomegacycles per second and, preferably, about 10 to 10,000 megacycles per second. The expression mHz. has the same meaning as the expression "megacycles per second" and the former expression may be used instead of the latter.

The duration of irradiation usually ranges from 0.0001 to 30 minutes, though the proper time depends upon such factors as the frequency of the electromagnetic wave selected, the type and grain size of vermiculite to be irradiated, the type and size of polar molecules or cations to be incorporated for expansion (which will be explained hereinafter).

The electromagnetic wave is supplied by any of per se known electromagnetic sources, e.g. an electronic range, high frequency welder or the like. The necessary power of the electromagnetic wave for the purpose should vary with other conditions such as the type, volume and grain size of vermiculite, the type and size of molecules or cations and the intended expansion degree. But it is usually in the range from $10^{-6}$ kilowatt·hour to 1 kilowatt·hour per gram of vermiculite.

The reaction vessel may be any kind of container if it is made of a material which is passable to microwave or far infrared radiation and which features a low induction loss. More specifically, vessels made of polyethylene resin, various types of glass, silicon, phenolic resin, polyester resin, epoxy resin and nylon may be mentioned by way of example.

In the method of the present invention any of minerals belonging to the mica group as mentioned above and containing water of crystallization are employed as the raw material. Furthermore, the raw material of the present invention includes a pre-treated vermiculite such as cation-exchanged vermiculite (e.g. a dyed vermiculite, protonated vermiculite, $Na^+$-exchanged vermiculite, $NH_4^+$-exchanged vermiculite, $Co^{2+}$-exchanged vermiculite, etc.).

It is advisable to employ vermiculite in average size of from about 1 to 10 millimeters, more desirably about 1 to 8 millimeters, in at least two dimensional directions.

In accordance with this invention, vermiculite as such can be directly expanded as aforesaid, but the object may be accomplished more efficiently by subjecting vermiculite to an electromagnetic wave treatment in admixture with polar molecules or cations in order to expand vermiculite in a shorter irradiation time per unit volume of vermiculite.

The polar molecules or cations may be any molecules or ions which are capable of entering into the lamellae of vermiculite and have polarities, that is to say which are of comparatively low molecular weight, namely, about 5000 or less. Exemplary of such molecules are water; hydrogen peroxide; alcohols such as methanol, ethylene glycol, polyethylene glycol and glycerin; ketones such as acetone; esters such as ethyl acetate; nitriles such as acetonitrile and benzonitrile; nitrogen-containing compounds exemplified by pyridine, aniline and urea, ether compounds exemplified by tetrahydrofuran, organic peroxides such as methyl ethyl ketone peroxide, benzoyl peroxide, cyclohexanone peroxide, anthraquinone peroxide, etc.; inorganic peroxides such as sodium perborate, potassium persulfate, ammonium perchlorate, sodium peroxide, etc.; peroxide adducts such as urea peroxide addition compound, phosphate peroxide addition compounds, etc.

Exemplary of the cations are those which are polyatomic, exemplified by ammonium ion, primary to quaternary ions such as alkyl ammonium ion (e.g. a monoammonium cation such as methyl ammonium, dimethyl ammonium, dipropyl ammonium, tetrapropyl ammonium ion, $(C_6H_{13})_3\overset{+}{N}H$, $(C_8H_{17})_3\overset{+}{N}H$, $(C_{10}H_{23})_2\overset{+}{N}H_2$, $C_{18}H_{37}\overset{+}{N}H_3$ or diammonium cation such as ethylene diammonium, cyclohexylene diammonium or the like) and complex cations such as

or the like. These species may be used singly or in combination, and they are employed in a form of a salt (e.g. chloride, phosphate, sulfate or the like).

In this connection, it is recommended for better expansion that those molecules or cations having at least one of nitrogen, sulfur or oxygen in their structure be used, and it should be noticed that an exchange of those cations for the $Mg^{2+}$ ions of vermiculite may be effected within vermiculite, and that according to the pH of the reaction system those cations may act as the polar molecules.

As regards the amount of the polar molecules or cations to be incorporated into vermiculite, the most economical and effective amount should be selected, while taking into consideration the type and size of vermiculite, the wavelength of the electromagnetic wave to be used, the time of expansion and the desired degree of expansion. Usually, to each kilogram of vermiculite, up to about 1000 moles or gram moles, preferably up to about 100 moles or gram moles and most preferably about 0.01 to 80 moles or gram moles, of polar molecules or cations, respectively, are employed. With regard to the admixture or ion-exchange of those polar molecules or cations, use may be made of conventional methods, such as mechanical mixing by the use of a mixer, mixing by means of vibrations and the method in which a solution of the molecules or cations is circulated. Those methods are usually carried out at atmospheric pressure, but improved results may occasionally be obtained at an elevated pressure.

It is well known that naturally occurring vermiculite ore can be dyed. In accordance with the method of the present invention, a dyed vermiculite may be employed as the raw material vermiculite, or alternatively the vermiculite expanded by the present invention may be dyed in the conventional means after the expansion, and further it is possible to simultaneously effect the expansion of vermiculite and the dying process.

The dying process is carried out according to the per se known methods for example by treating vermicule or a protonated vermiculite with color-forming cations or the corresponding color-forming molecule, which is capable of forming the color-forming cations with proton, before or after the expansion.

Among the useful color-forming cations are complex ions of metals with suitable ligands, mordant dyes or organic ammonium ions obtainable by adjusting the pH of dyes having primary to quaternary amino groups, and the like. Aside from those ions, any other color-forming cation may be likewise employed. More specifically, as said transition metal ions, the ions of metals having atomic numbers from 22 to 29 and from 57 to 71 are usually employed.

With regard to said color-forming metal complex ions, the combination of any of the metals which can be ions (for example, Fe, Mn, Co, Ni, etc.) with any of such ligands as water, ammonia, cyanide, molecules which are generally used in chelatometry, e.g. ethylenediamine, acetylacetone, pyridine, dipyridyl, 8-oxyquinoline, etc., and mordant dyes exemplified by alizarin, phthalocyanine, 4,4',4''-triaminotriphenylcarbinol, 1,4 - diaminoanthraquinone, 4,4'-methylene bis(2-chloroaniline) or the like can be used.

The primary to quaternary amines which can yield color-forming ammonium cations are what are generally known as basic dyes, such as diamines having the aniline structure, e.g. phenylenediamine, benzidine, etc., and their derivatives; triphenylmethane type basic dyes having at least one amino group which are exemplified by malachite green and fuchsin; oxazine type basic dyes; xanthene type basic dyes such as rhodamine; azine dyes such as safranine; aminoanthraquinone dyes; and the like. Those species are employed to modify the color of the product.

The protonated vermiculite above mentioned is prepared for example by treating naturally occurring vermiculite with a mineral acid.

To effect such a coloration or a modification of color, any known ion exchange means may be employed to advantage, insofar as the object will not be thwarted. More specifically, use may be made of the method in which the vermiculite or the expanded vermiculite is immersed in a solution of a salt of one of said ions in water or organic solvent (for example, acetone, alcohol or benzene) or the method in which said aqueous or organic solvent solution is circulated throughout the vermiculite or the expanded vermiculite. As regards the salts of ions mentioned above, the corresponding mineral acid salts such as hydrochloride, sulfate, nitrate, etc. or the corresponding organic acid salts such as acetate, formate, tartarate, oxalate, etc. may be used to advantage.

Thus vermiculite or the expanded vermiculite is dyed by the replacement of $Mg^{2+}$ ions thereof with the color-forming cations. While the ion exchange capacity of vermiculite with respect to color-forming cations varies with different sources of vermiculite, it is not necessary, when vermiculite is dyed according to this invention, to effect the replacement to full exchange capacity. The exchange is usually carried out up to a degree of about 80 to about 200 milliequivalents/100 g. vermiculite or expanded vermiculite. In the case of amine dyes having pronounced color-forming properties, sufficiently attractive colors are sometimes obtained when an ion exchange is carried out to $\frac{1}{500}$ of the total ion exchange capacity.

It is to be noted that when a dye having two or more amino groups is used for dyeing vermiculite ore or expanded vermiculite it is difficult to directly replace the magnesium ion of vermiculite with the ammonium ion, but the desired ion exchange can easily be effected by replacing some of the magnesium ions of vermiculite with sodium ions and, then, replacing the sodium ions with the color-forming amine dye.

In the method of the present invention, other per se known cation-exchanged vermiculites may be advantageously employed as the raw material.

$Na^+$-exchanged vermiculite or $Li^+$-exchanged vermiculite is subjected to the irradiation with the electromagnetic wave, whereby an expanded vermiculite having stronger deodorizing activity is obtained. Alternatively, the same purpose is achieved by replacing $Mg^{2+}$ ion of the expanded vermiculite, which is prepared by irradiating naturally occurring vermiculite ore, with $Na^+$ ion or $Li^+$ ion by conventional means.

$Co^{2+}$-exchanged vermiculite is particularly employed as the raw material vermiculite to obtain beautiful colored expanded vermicuite. $Co^{2+}$-exchanged vermiculite is subjected to the expansion of the present invention and thus expanded vermiculite is treated with an aqueous ammonia to obtain the expanded $Co(NH_3)_6^{2+}$-vermiculite of reddish violet color. The cation exchange may be carried out by conventional procedures, for example by immersing the material in an aqueous solution of a salt (e.g. chloride, sulfate, phosphate) containing the cation (e.g. $Na^+$) or circulating such a solution throughout the vermiculite.

Expanded vermiculite is thus obtained, its volume being variable within the range of about 5 to about 50 times the volume of vermiculite depending upon the frequency of the electromagnetic wave used, the duration of irradiation, the concentration, type and amount of molecules or ions incorporated, and other conditions.

The degree of expansion is selected to suit the intended application of the produuct. Usually, about 15 to about 20 times the initial volume is frequently employed. When the degree of expansion is low, the above expansion procedure can be repeated. Alternatively, the degree of expansion can be increased by spraying or pouring a peroxide (e.g. hydrogen peroxide, benzoyl peroxide) or a solution thereof over the product.

Following are presently preferred illustrative embodiments of this invention. In these examples, the parts by weight bear the same relationship to parts by volume as do grams to milliliters.

EXAMPLE 1

A glass container of 2000 parts by volume capacity is filled with 100 parts by weight of vermiculite (about 5 millimeters square). The beaker is covered with a polyethylene sheet and placed in a 500 watt electronic range of 2450 mHz. (manufactured by Matsushita Electric Company, Ltd. in Japan; NE 5500). After 3 minutes irradiation, the apparent volume of the vermiculite is 1200 parts by volume.

This expanded vermiculite (100 parts by weight) is put into a 1 N aqueous solution of cupric nitrate and heated at 100° C. for 2 hours, followed by filtration and washing. The expanded vermiculite thus obtained is analyzed for $Cu^{2+}$. It is found that its ion exchange capacity is 180 milliequivalents/100 grams vermiculite. The expanded vermiculite which has been subjected to an ion exchange with cupric nitrate as above has a light greenish color.

EXAMPLE 2

A 2000 parts by volume glass-ceramics vessel fitted with a lid is filled with 100 parts by weight of vermiculite (about 3 millimeters square) and 30 parts by volume of 35% aqueous solution of hydrogen peroxide. After stirring well, the vessel is placed in an electronic range of the type described in Example 1.

The vermiculite is thus irradiated with an electromagnetic wave of 2450 mHz. for 1 minute and, then, allowed to stand for 2 minutes. The apparent volume of the product is 1600 parts by volume. This expanded vermiculite is placed in a desiccator containing phosphorus pentoxide and allowed to dry under reduced pressure for 30 minutes. At this time, the product weights 85 parts by weight. When this product is placed in a sealed vessel at 20° C. and 95% RH (relative humidity) its weight increases to 97 parts by weight in 1 hour.

EXAMPLE 3

Ten parts by weight of vermiculite (about 3 millimeters square), which has been immersed in 100 parts by volume of 0.5 N aqueous solution of sodium chloride for 1 month, is recovered by filtration and dried at 100° C. It is then placed in a polyethylene vessel, to which 1 part by volume of 35% aqueous solution of hydrogen peroxide and 3 parts by volume of distilled water are added. The vessel is then placed in an electronic range of the type described in Example 1, where the system is irradiated with an electro-magnetic wave of 2450 mHz. for 2 minutes. By this procedure, the volume of the vermiculite is increased to 140 parts by volume.

This sample is directly placed in a sealed vessel containing a large amount of ammonia gas and allowed to stand there for a week. By X-ray diffraction, the product is found to be $NH_4^+$-vermiculite. This fact clearly shows that the expanded vermiculite according to this invention is a useful deodorizer.

EXAMPLE 4

Ten parts by weight of vermiculite (about 5 millimeters square) is immersed in 300 parts by volume of a 2 N aqueous solution of $NH_4Cl$ and heated at 100° C. for 2 hours. The $NH_4^+$-vermiculite thus obtained is recovered by filtration, washed, dried at 120° C. for 1 hour, and allowed to cool. The vermiculite is then placed in a polyethylene vessel and irradiated with an electromagnetic wave of 2450 mHz. in an electronic range of the type described in Example 1 for 5 minutes. By this treatment, the volume of the sample is increased to 40 parts by volume. A portion of this sample is put into a solid-acidity indicator (a solution of dicinnamalacetone in benzene, pK=—3.0); whereupon the indicator turns red.

EXAMPLE 5

A messcylinder calibrated to 200 parts by volume is filled with 10 parts by weight of vermiculite (about 3 millimeters square) and 5 parts by volume of water, and placed in a 500 w. electronic range of 2450 mHz., where the system is irradiated with the electromagnetic wave for 5 minutes.

By this procedure, the volume of the vermiculite ore is increased from 14 parts by volume to about 30 parts by volume. The messcylinder containing the vermiculite is taken out, and 3 parts by volume of 25% aqueous solution of hydrogen peroxide is sprinkled over the vermiculite, whereupon the volume of the vermiculite is increased to about 100 parts by volume in an instant. The cylinder is then placed in the above electronic range and irradiated with an electromagnetic wave of 2450 mHz. used in Example 1 for 30 seconds, whereupon the volume is increased to 120 parts by volume.

EXAMPLE 6

A mixture is made by well kneading 300 parts by weight thiourea, 1000 parts by weight of vermiculite (about 8 millimeters square) and 150 parts by volume of water. The mixture is put into a glass container of 15,000 parts by volume capacity and is placed in an electronic range of 2450 mHz. used in Example 1. Irradiation is carried out at the power of 500 watts for 10 minutes The vermiculite is expanded, while ammonia gas is evolved, to completely fulfill the glass container. 100 parts by weight of the expanded vermiculite is placed in a desiccator containing phosphorus pentoxide in the bottom and dried for 1 hour under reduced pressure to weigh 92 parts by weight. When this material is placed in a sealed vessel at 20° C. and 95% RH (relative humidity), its weight increases to 115 parts by weight.

EXAMPLE 7

In a 2000 parts by volume capacity glass container there are added 100 parts by weight of vermiculite (about 3 millimeters square; sold by Parabora, Mining Co., Ltd., South Africa Republic), 20 parts by weight of urea and 30 parts by weight of water, and the mixture is well kneaded. The resultant mixture is irradiated with electromagnetic wave of 2450 mHz. in the same way as in Example 1 for 7 minutes to expand up to 1200 parts by volume weighing 102 parts by weight. When the product is placed in a desiccator of 95% RH (relative humidity), the weight of the product, after 1 hour, increased to 112 parts by weight; and when it is then placed into a desiccator containing phosphorus pentoxide at room temperature for 1 hour, the weight of the product decreased to 102 parts by weight.

EXAMPLE 8

30 parts by weight of urea, 30 parts by volume of water and 150 parts by weight of hydrobiotite are placed in a container of 2000 parts by volume capacity. Irradiation is carried out for 8 minutes in the same way as in Example 7 to obtain 1100 parts by volume of expanded hydrobiotite.

EXAMPLE 9

In the same procedure as in Example 2, the respective polar molecule listed below is added in admixture with 10 parts by volume of water in place of hydrogen peroxide, followed by irradiation and the results are summarized below.

| Polar molecule | Amount of polar molecule [1] | Irradiation time (minutes) | Expansion ratio [2] |
|---|---|---|---|
| $CO(NH_2)_2$—$H_2O_2$ complex | 0.1 | 3 | 10 |
|  | 0.3 | 5 | 7.5 |
| Ethylene diamine plus water (1:1 weight/weight) | 0.3 | 5 | 8.0 |
| Powdery purification residue of crude toluene diisocyanate | 0.6 | 7 | 10 |
| Ethylene glycol | 0.4 | 5 | 10 |
| Glycerin | 0.4 | 5 | 12 |
| Polyethylene glycol [3] | 0.4 | 5 | 10 |
| Do.[4] | 0.4 | 5 | 10 |
| Actcol 2156 [5] | 0.6 | 5 | 10 |
| Actcol 3156 [6] | 0.6 | 5 | 10 |
| Nikkol HCO-50 [7] | 0.4 | 5 | 10 |
| Ethylene glycol plus $H_2O_2$ (10:3 weight/weight) | 0.3 | 4 | 12 |
| Actcol 3156 [6] plus $H_2O_2$ (10:3 weight/weight) | 0.3 | 4 | 12 |
| $KH_2PO_4$—$H_2O_2$ | 0.35 | 2 | 12 |
| Sodium pyrophosphate peroxide | 0.35 | 2 | 12 |
| Methylethylketone peroxide | 0.25 | 2 | 12 |
| Benzoyl peroxide | 0.30 | 3 | 12 |
| Sodium perborate | 0.6 | 10 | 8 |
| Tetrahydrofuran | 0.4 | 2.5 | 6 |
| Acetonitrile | 0.45 | 4 | 7 |
| $Na_2O_2$ | 0.6 | 5 | 6 |

[1] Polar molecule/vermiculite.
[2] Volume of product/volume of raw vermiculite.
[3] Its average molecular weight is about 500.
[4] Its average molecular weight is about 700.
[5] "Actcol 2156" is a tradename of a polyoxypropylene trial mixture of hydroxy number 56 (average molecular weight 2000), sold by Takeda Chemical Industries, Ltd., Osaka, Japan.
[6] "Actcol 3156" is a tradename of a polyoxypropylene trial mixture of hydroxy number 56 (average molecular weight 3000), sold by Takeda Chemical Industries, Ltd., Osaka, Japan.
[7] "Nikkol HCO-50" is a tradename of polyoxyethylene hydrogenated castor oil (specific gravity=1.04 at 50° C.), sold by Nikko Chemicals Co., Ltd., Tokyo, Japan.

EXAMPLE 10

In the same procedure as in Example 1, the respective cation-exchanged vermiculites illustrated in the following table are employed in place of the naturally occurring vermiculite ore, and the results are obtained.

| Cation exchanged vermiculite | Irradiation time (minutes) | Expansion ratio [1] |
|---|---|---|
| $Cu(NH_3)_4^{++}$-vermiculite | 4 | 12 |
| $Co(NH_3)_6^{++}$-vermuculite | 3 | 10 |
| $Ni(NH_3)_4^{2+}$-vermiculite | 3 | 10 |
| $NH_2$—⟨ H ⟩—$NH_3^+$-vermiculite | 5 | 10 |
| ⟨N⟩$^+$-vermiculite | 5 | 10 |
| $C_{18}H_{32}NH_3^+$-vermiculite | 5 | 10 |
| $K^+$-vermiculite | 2 | 13 |
| $Ca^{2+}$-vermiculite | 3 | 12 |
| $Ba^{2+}$-vermiculite | 3 | 12 |
| $Cu^{2+}$-vermiculite | 3 | 12 |
| $Ni^{2+}$-vermiculite | 3 | 12 |
| $Mn^{2+}$-vermiculite | 2 | 10 |
| $Fe^{2+}$-vermiculite | 2 | 10 |
| $Fe^{3+}$-vermiculite | 2 | 10 |
| $Al(OH)^{0.5+2.5}$-vermiculite | 2 | 10 |
| $Zn^{2+}$-vermiculite | 5 | 10 |
| $Co^{2+}$-vermiculite | 4 | 11.5 |

[1] Volume of product/volume of raw vermiculite.

What is claimed is:

1. A method for expanding vermiculite, which comprises irradiating the vermiculite with microwaves of a power within the range of from $10^{-6}$ kilowatt hour to 1 kilowatt·hour per gram of vermiculite.

2. A method as claimed in claim 1, wherein the vermiculite is irradiated in admixture with polar molecules or cations, the molecules or cations having a molecular weight of not more than 5000.

3. A method as claimed in claim 2, wherein the polar molecules or cations have at least one of nitrogen, sulfur, and oxygen atoms in their structures.

4. A method as claimed in claim 2, wherein the amount of the polar molecules or cations is in the range from 0.01 to 80 moles equivalent per kilogram of the vermiculite.

5. A method as claimed in claim 2, wherein the polar molecules are water molecules.

6. A method as claimed in claim 2, wherein the polar molecules are hydrogen peroxide molecules.

7. A method as claimed in claim 2, wherein the polar molecules are urea molecules.

8. A method as claimed in claim 2, wherein the polar molecules are thiourea molecules.

9. A method as claimed in claim 2, wherein the polar molecules are $NH_2CONH_2$—$H_2O_2$ complex molecules.

10. A method as claimed in claim 2, wherein the polar molecules are $KH_2PO_4$—$H_2O_2$ complex molecules.

11. A method as claimed in claim 2, wherein the cations are $Cu(NH_3)_4^{++}$ cations.

12. A method as claimed in claim 1, wherein the vermiculite is a cation-exchanged vermiculite.

13. A method as claimed in claim 12, wherein the cation-exchange vermiculite is $Na^+$-exchanged vermiculite.

14. A method as claimed in claim 12, wherein the cation-exchanged vermiculite is $Li^+$-exchanged vermiculite.

15. A method as claimed in claim 12, wherein the cation-exchanged vermiculite is $Co^{2+}$-exchanged vermiculite.

16. A method as claimed in claim 12, wherein the cation-exchanged vermiculite is $NH_4^+$-exchanged vermiculite.

17. A method as claimed in claim 1, wherein the vermiculite is a dyed vermiculite.

18. A method as claimed in claim 17, wherein the dyed vermiculite is vermiculite dyed with 4,4',4''-triaminotriphenylcarbinol, 1,4-diaminoanthraquinone, 4,4'-methylene bis(2-chloroaniline) or cupric nitrate.

References Cited

UNITED STATES PATENTS 2,915,477  12/1959  Hans-Werner Rotter  252—378 R
3,062,753  11/1962  Hayes  252—378 R

FOREIGN PATENTS 276,170  1/1966  Australia  252—378
1,167,798  10/1969  Great Britain  252—378

HOWARD S. WILLIAMS, Primary Examiner

U.S. Cl. X.R.

204—157.1 R; 264—25